US009186980B2

(12) United States Patent
Shibutani et al.

(10) Patent No.: US 9,186,980 B2
(45) Date of Patent: Nov. 17, 2015

(54) VEHICLE RADIATOR SUPPORT STRUCTURE

(71) Applicant: MAZDA MOTOR CORPORATION, Hiroshima (JP)

(72) Inventors: Shinji Shibutani, Hiroshima (JP); Naomi Hayashi, Hiroshima (JP); Hirosato Izumi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 13 days.

(21) Appl. No.: 14/191,252

(22) Filed: Feb. 26, 2014

(65) Prior Publication Data

US 2014/0251706 A1    Sep. 11, 2014

(30) Foreign Application Priority Data

Mar. 11, 2013    (JP) .................................. 2013-047535

(51) Int. Cl.
  *B60K 11/04*    (2006.01)
  *B62D 21/00*    (2006.01)

(52) U.S. Cl.
  CPC ...................................... *B60K 11/04* (2013.01)

(58) Field of Classification Search
  CPC ........ B60K 11/04; B60K 11/08; B60K 17/04; F28F 2275/143; F28F 9/002; F28F 2275/14; F28F 2275/205; F16F 15/08; F16F 1/373; F16F 7/1028; F16F 7/108
  USPC ..................... 180/68.4, 68.6, 312; 165/67, 69
  See application file for complete search history.

(56) References Cited

U.S. PATENT DOCUMENTS

| 4,121,682 | A | * | 10/1978 | Schaal et al. | 180/68.4 |
| 4,538,697 | A | * | 9/1985 | Muroi et al. | 180/68.4 |
| 4,564,168 | A | * | 1/1986 | Ikuta et al. | 248/638 |
| 4,579,184 | A | * | 4/1986 | Hiramoto | 180/68.4 |
| 4,742,881 | A | * | 5/1988 | Kawaguchi et al. | 180/68.4 |
| 4,766,968 | A | * | 8/1988 | Matsunaga | 180/68.4 |

(Continued)

FOREIGN PATENT DOCUMENTS

| DE | 3916777 A1 | 4/1990 |
| DE | 102 07 025 A1 | 8/2003 |

(Continued)

OTHER PUBLICATIONS

An Office Action issued by the German Patent Office on Dec. 5, 2014, which corresponds to German Patent Application No. 10 2014 002 269.2 and is related to U.S. Appl. No. 14/191,252; with English language translation.

*Primary Examiner* — J. Allen Shriver, II
*Assistant Examiner* — Bridget Avery
(74) *Attorney, Agent, or Firm* — Studebaker & Brackett PC

(57) ABSTRACT

A vehicle radiator support structure which includes a plurality of upper holding members each attached to an upper shroud member which is one of a plurality of structural members of a vehicle body and configured to hold an upper portion of a radiator in such a manner as to restrict a horizontal relative displacement thereof. At least one pair of lateral elastic members is each attached to a respective one of right and left lateral portions of the radiator. At least one pair of lateral engagement members is each attached to another one of the structural members other than the upper shroud member and configured to come into contact engagement with at least an upper portion of a respective one of the lateral elastic members.

8 Claims, 7 Drawing Sheets

(56) References Cited

U.S. PATENT DOCUMENTS

| | | | |
|---|---|---|---|
| 4,770,234 A * | 9/1988 | Hiraoka et al. | 165/69 |
| 5,127,466 A * | 7/1992 | Ando | 165/67 |
| 5,183,103 A * | 2/1993 | Tokutake | 165/67 |
| 5,544,714 A * | 8/1996 | May et al. | 180/68.4 |
| 5,558,310 A * | 9/1996 | Furuie et al. | 248/573 |
| 5,996,684 A * | 12/1999 | Clifton et al. | 165/67 |
| 6,059,019 A * | 5/2000 | Brost et al. | 165/67 |
| 6,199,622 B1 * | 3/2001 | Mashio et al. | 165/67 |
| 6,202,737 B1 * | 3/2001 | Mahe | 165/67 |
| 6,513,579 B1 * | 2/2003 | Kent et al. | 165/67 |
| 7,942,223 B2 * | 5/2011 | Obayashi et al. | 180/68.4 |
| 8,061,410 B2 * | 11/2011 | Machanek | 165/76 |
| 8,281,848 B2 * | 10/2012 | Park | 165/67 |
| 2004/0200598 A1 * | 10/2004 | Hitt et al. | 165/69 |
| 2005/0062315 A1 | 3/2005 | Andritter et al. | |
| 2012/0227239 A1 | 9/2012 | Itoh | |

FOREIGN PATENT DOCUMENTS

| | | |
|---|---|---|
| DE | 10 2004 060788 A1 | 7/2006 |
| DE | 10 2005 002058 A1 | 9/2006 |
| DE | 10 2012 004955 A1 | 11/2012 |
| FR | 2998222 A1 * | 5/2014 |
| JP | 06-055942 A | 3/1994 |
| JP | H08-132893 A | 5/1996 |
| WO | 02/064394 A1 | 8/2002 |

* cited by examiner

VEHICLE RADIATOR SUPPORT STRUCTURE

TECHNICAL FIELD

The present invention relates to a vehicle radiator support structure, and more particularly to a vehicle radiator support structure intended to allow a radiator to be utilized as an inertial mass for a vibration damping action with respect to a front portion of a vehicle body, and belongs to the field of vibration damping techniques for automotive vehicles.

BACKGROUND ART

Heretofore, in automotive vehicles, a vibration damping technique, so-called "dynamic damper", has been employed which is intended to reduce vibration and noise in a front portion of a vehicle body arising from vehicle traveling, wherein a member having a certain level of weight and mounted on the front portion of the vehicle body, such as a radiator or a battery, is utilized as an inertial mass, thereby achieving a reduction in vibration and others in the front portion of the vehicle body.

In this technique, when a radiator is utilized as an inertial mass so as to obtain a dynamic damper effect, it is common practice to use a support structure as illustrated in FIG. 7, wherein upper and lower portions of a radiator 101 are mounted, respectively, to two structural members 103, 104 of a vehicle body through a plurality of elastic mounts 102 serving as a spring for absorbing or damping vibrations in vehicle up-down, right-left and front-rear directions.

Meanwhile, as means to improve drivability of an automotive vehicle, particularly, a sporty vehicle, lowering the center of gravity of the vehicle is effective. For this purpose, it is conceivable to reduce a weight of an upper portion of the vehicle body by reducing a plate thickness of a structural member constituting the upper portion.

However, in the above conventional radiator support structure, if a plate thickness of a structural member for supporting the upper portion of the radiator is reduced, radiator supporting rigidity of the structural member is deteriorated, so that the structural member is liable to fail to bear a load, particularly, an upward moving load, of the radiator, resulting in difficulty in sufficiently obtaining the dynamic damper effect.

Further, there has been known a structure in which right and left lateral portions of a radiator are mounted to a vehicle body through a plurality of elastic mounts, as disclosed, for example, in JP 06-055942A. In the conventional structure disclosed in this patent document, one pair of support base plates are disposed in such a manner as to sandwich therebetween opposite lateral portions of a radiator in a vehicle width direction, wherein at least one pair of elastic mounts provided to protrude from the respective lateral portions of the radiator in the vehicle width direction are fittingly inserted, respectively, into at least one pair of support tube portions each provided in a respective one of the support base plates, whereby the radiator is supported by the support base plates through the elastic mounts. Thus, in an operation of mounting the radiator to a vehicle body, it is necessary to install the radiator to the vehicle body, after attaching the support base plates to the respective lateral portions of the radiator. However, during the installation, it is necessary to use a special jig for retaining a posture of the support base plates or the radiator. Thus, the installation of the radiator to the vehicle body has not been easy.

SUMMARY OF THE INVENTION

The present invention has been made in view of the above circumstances, and addresses a technical problem of allowing a structural member bearing a moving load of a radiator to be reduced in plate thickness and thus reduced in weight, while maintaining radiator support rigidity, thereby lowering the center of gravity of a vehicle to achieve improved drivability.

In order to solve the above technical problem, the present invention provides a vehicle radiator support structure for mounting upper and lower portions of a radiator to a vehicle body. The radiator support structure comprises: a plurality of upper holding members each attached to an upper shroud member which is one of a plurality of structural members of the vehicle body and configured to hold the upper portion of the radiator in such a manner as to restrict a horizontal relative displacement thereof; at least one pair of lateral elastic members each attached to a respective one of right and left lateral portions of the radiator; and at least one pair of lateral engagement members each attached to another one of the structural members other than the upper shroud member and configured to come into contact engagement with at least an upper portion of a respective one of the lateral elastic members.

DESCRIPTION OF EMBODIMENTS

With reference to FIGS. 1 to 6, a radiator support structure of the present invention will now be described in connection with one embodiment thereof in which the present invention is applied to a front portion of a vehicle body of an automotive vehicle. A radiator support structure according to this embodiment will be described based on an example in which the structure is designed to support a radiator equipped with two coolant tanks on right and left sides thereof, so-called "cross flow radiator", with respect to the front portion of the vehicle body. In FIGS. 1 to 6, the arrow X, the arrow Y, and the arrow Z, indicate, respectively, a rightward side in a vehicle width (right-left or lateral) direction, a rearward side in a vehicle forward-backward (front-rear or longitudinal) direction, and an upward side in a vehicle up-down direction.

Figure 1:
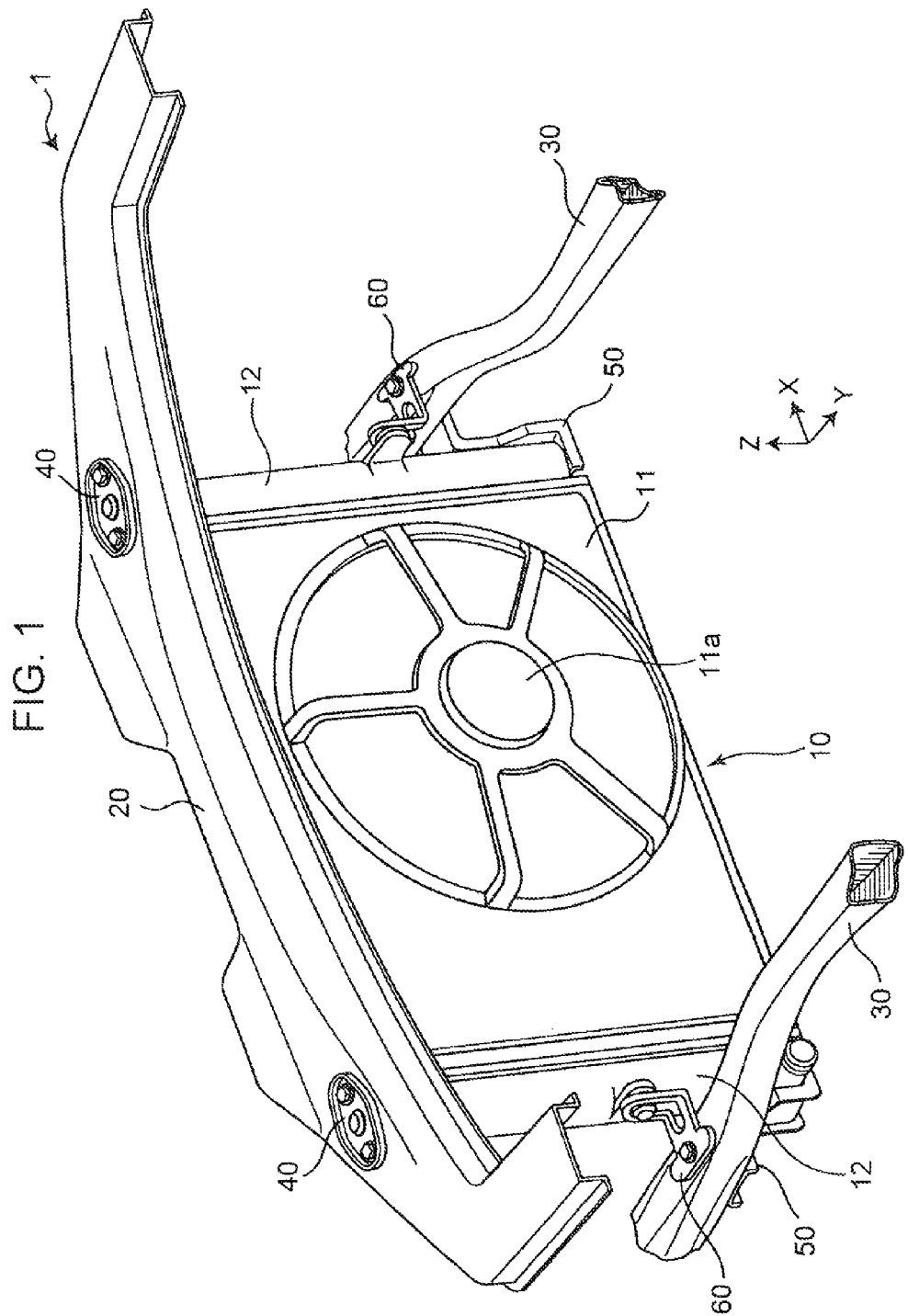
FIG. 1 is a perspective view illustrating a radiator support structure according to one embodiment of the present invention.

FIG. 1 is a perspective view illustrating an outline of a support structure for a radiator 10, according to one embodiment of the present invention.

Although not illustrated, one pair of right and left front side frames (not illustrated) are arranged in a front region of the vehicle to extend in a vehicle front-rear direction. One pair of right and left suspension towers (not illustrated) are arranged outside the respective front side frames in a vehicle width direction to allow a front wheel suspension assembly (not illustrated) to be fixed thereto, and further one pair of right and left wheel apron reinforcement members (not illustrated)

are arranged outside the respective suspension towers in the vehicle width direction to extend in the vehicle front-rear direction.

An upper shroud member 20 is connected to respective front ends of the wheel apron reinforcement members. The upper shroud member 20 is arranged in the front region of the vehicle to extend in the vehicle width direction (in the X and reverse-X direction), and vehicle-widthwise opposite ends thereof are connected, respectively, to the right and left wheel apron reinforcement members.

The upper shroud member 20 is a structural member having a cross-sectionally angular-C shape opened downwardly. The upper shroud member 20 has a vehicle-widthwise central portion formed in an arc shape smoothly protruding in a vehicle frontward direction, and each of the vehicle-widthwise opposite ends of the upper shroud member 20 is formed to extend in a vehicle rearward (Y) direction.

A shroud panel (not illustrated) constituting a front end wall of a vehicle body 1 is arranged underneath the upper shroud member 20. The shroud panel has an upper edge connected to a lower surface of the upper shroud member 20, and vehicle-widthwise opposite edges of the shroud panel are connected, respectively, to front ends of the front side frames.

Further, one pair of right and left suspension members 30 are arranged in the front region of the vehicle to extend in the vehicle front-rear direction (in the Y and reverse-Y direction). The front wheel suspension assembly and an engine (not illustrated) are mounted to the suspension members 30.

The radiator 10 is designed to cool the engine, and arranged between the pair of right and left front side frames. The radiator 10 is supported by the upper shroud member 20 disposed just above the radiator 10, and the suspension members 30 each disposed beside and in spaced-apart relation to a respective one of right and left lateral portions of the radiator 10, through a plurality of (in this embodiment, one pair of) upper brackets 40, at least one pair of (in this embodiment, one pair of) lower brackets 50, and at least one pair of (in this embodiment, one pair of) lateral brackets 60. In this regard, the upper bracket 40, the lower bracket 50 and the lateral brackets 60 in this embodiment are equivalent, respectively, to "upper holding member", "lower support member" and "lateral engagement member" set forth in the appended claims.

Figure 2:
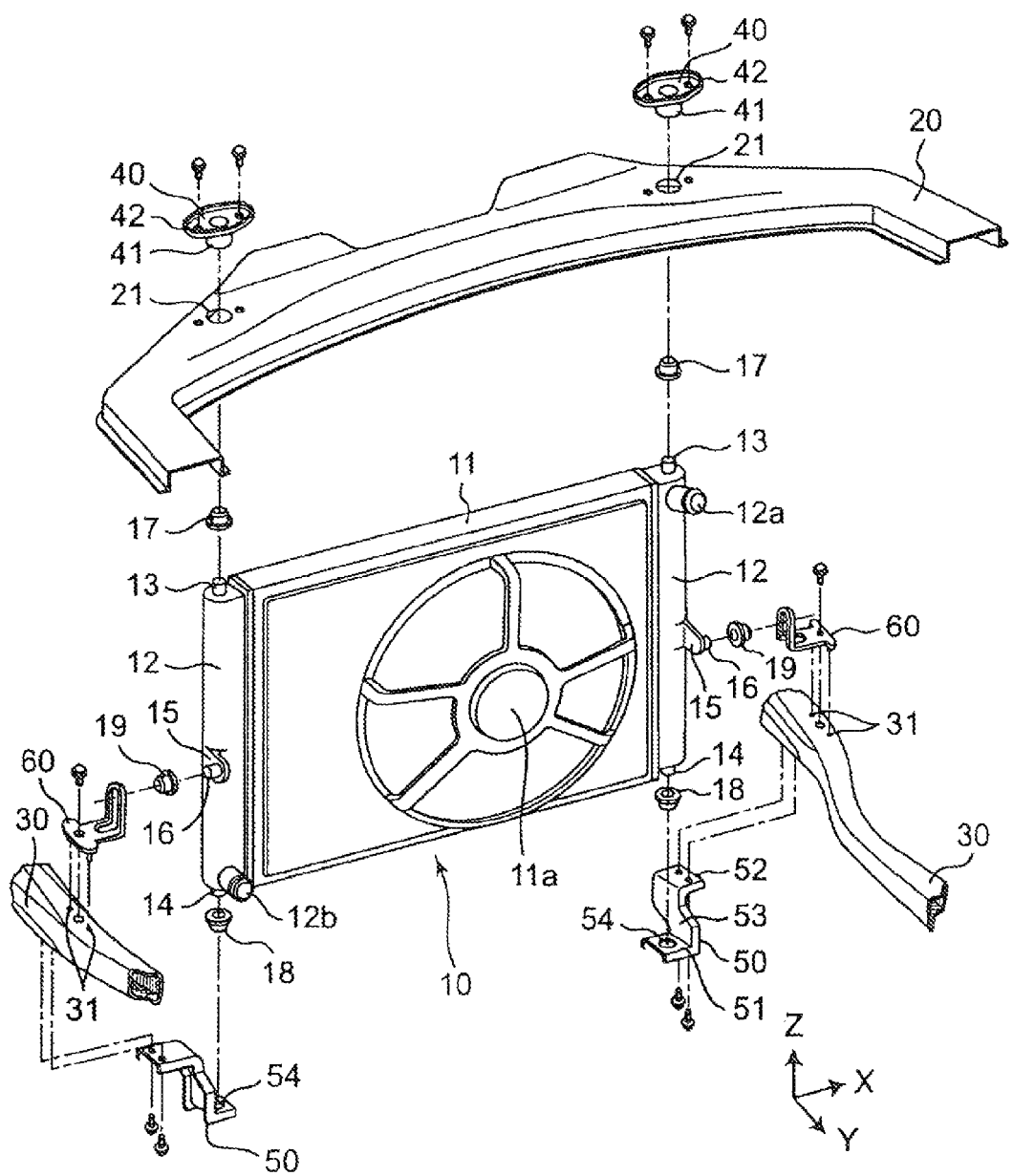
FIG. 2 is an exploded perspective view of the radiator support structure in FIG. 1.

FIG. 2 is an exploded perspective view illustrating the support structure for the radiator 10, in FIG. 1, in a state in which the structure is disassembled into components.

As illustrated in FIGS. 1 and 2, the radiator 10 primarily comprises a radiator main unit 11 provided with an electric fan 11a, and two tank sections 12, 12 provided, respectively, on right and left lateral sides of the radiator main unit 11. The radiator main unit 11 has a plurality of coolant flow passages (not illustrated) disposed side-by-side in the vehicle up-down direction with a given distance therebetween and each extending in the vehicle width direction. The electric fan 11a is provided on a rearward (Y) side of the radiator main unit 11. The electric fan 11a is configured to be rotated by an electric motor in such a manner as to generate an airstream flowing rearwardly from the side in font of the vehicle, thereby assisting a wind inflowing from the side in front of the vehicle during vehicle traveling in passing through interspaces between the flow passages of the radiator main unit 11.

Each of the tank sections 12, 12 is a tubular body having an internal space to which one of upstream and downstream ends of each of the above flow passages disposed side-by-side in the vehicle up-down direction is opened. The tubular body is entirely formed using a resin material. The rightward (X)-side tank section 12 has an inlet portion 12a integrally formed therewith at a position on an upper side thereof to introduce therethrough coolant from a hose connected thereto, and the leftward (reverse-X)-side tank section 12 has an outlet portion 12b integrally formed therewith at a position on a lower side thereof to discharge coolant therethrough. Thus, coolant introduced from the inlet portion 12a of the rightward-side tank section 12 and temporarily stored within the rightward-side tank section 12 flows into the plurality of flow passages of the radiator main unit 11 via the upstream end openings, so that the coolant is cooled during the course of flowing through the flow passages. Then, the coolant ejected from the flow passages into the leftward-side tank section 12 via the downstream end openings and temporarily stored within the leftward-side tank section 12 is discharged from the outlet portion 12b of the leftward-side tank section 12.

The tank sections 12, 12 are integrally provided, respectively, with one pair of pin-shaped upper-elastic-mount support segments 13 each protruding upwardly (in a Z direction) from a top surface of a respective ones thereof. The tank sections 12, 12 are also integrally provided, respectively, with one pair of pin-shaped lower-elastic-mount support segments 14 each protruding downwardly (in a reverse-Z direction) from a bottom surface of a respective one thereof.

Further, the tank sections 12, 12 are integrally provided, respectively, with one pair of flange-shaped lateral flange portions 15 each protruding rearwardly (in the Y direction) from a lateral portion of a respective one thereof. The lateral flange portions 15 are integrally provided, respectively, with one pair of pin-shaped lateral-elastic-mount support segments 16 each protruding laterally (in the X or reverse-X direction) from an outer surface of a respective one thereof. In a state after the radiator 10 is installed to the vehicle body 1, each of the lateral-elastic-mount support segments 16 is arranged to be located above a respective one of the suspension members 30 and below a respective one of the front side frames (not illustrated). In this regard, the lateral-elastic-mount support segment 16 is equivalent to "lateral-elastic-member support segment" set forth in the appended claims.

One pair of upper elastic mounts 17 are attached, respectively, to the upper-elastic-mount support segments 13, and one pair of lower elastic mounts 18 are attached, respectively, to the lower-elastic-mount support segments 14. Further, one pair of lateral elastic mounts 19 are attached, respectively, to the lateral-elastic-mount support segments 16. In this regard, the lower elastic mount 18 is equivalent to "lower elastic member" set forth in the appended claims, and the lateral elastic mount 19 is equivalent to "lateral elastic member" set forth in the appended claims.

Each of the elastic mounts 17 (18, 19) is a cylindrical-shaped member having a through-hole along a central axis thereof, and is integrally formed as a single body having a flange portion provided at one end thereof, using an elastic material, such as rubber, having elasticity and strength required for obtaining a dynamic damper effect. The through-hole of each of the elastic mounts 17 (18, 19) has an inner diameter slightly less than an outer diameter of a respective one of the support segments 13 (14, 16). Each of the elastic mounts 17 (18, 19) can be easily detachably attached to a respective one of the support segments 13 (14, 16) by fittingly inserting the support segment 13 (14, 16) into the through-hole of the elastic mount 17 (18, 19).

Each of the upper brackets 40 is integrally formed using a resin material, as a single body which comprises a shaft portion 41 having a downwardly-opened recess 43 (FIG. 4), and a specially-shaped flange portion 42 provided at an upper end of the shaft portion 41. The flange portion 42 is formed with two bolt-penetration through-holes each configured to allow a bolt to be penetratingly inserted thereinto when the bolt is fastened during an operation of attaching each of the upper brackets 40 to the upper shroud member 20.

Each of the lower brackets 50 is a member having a cross-sectionally angular-C shape opened downwardly. Each of the lower brackets 50 primarily comprises: a lower support portion 51 extending approximately horizontally; an upper support portion 52 extending approximately horizontally; and an intermediate connection portion 53 located between the lower support portion 51 and the upper support portion 52 to interconnect them. The lower support portion 51 is formed with a through-hole 54 configured to allow the lower elastic mount 18 to be fittingly inserted thereinto. The upper support portion 52 is formed with a bolt-penetration through-hole configured to allow a bolt to be penetratingly inserted thereinto when the bolt is fastened during an operation of attaching each of the lower brackets 50 to a respective one of the suspension members 30.

The upper shroud member 20 has two openings 21 formed in a top wall thereof at bilaterally symmetric positions. Each of the openings 21 is designed to allow the shaft portion 41 of a respective one of the upper brackets 40 to be penetratingly inserted thereinto, and formed at a position opposed to a respective one of the upper elastic mounts 17 attached onto the radiator 10 in the state after the radiator 10 is installed to the vehicle body 1. The upper shroud member 20 also has two screw holes formed at respective positions on right and left sides of the opening 21 so as to boltingly attach the upper bracket 40 thereto.

Each of the suspension members 30 is a tubular-shaped structural member having a rectangular cross-section. Each of the suspension members 30 has a bottom wall formed with a screw hole (not illustrated) for boltingly attaching a respective one of the lower brackets 50 thereto. Each of the suspension members 30 has a top wall formed with a screw hole for boltingly attaching a respective one of the lateral brackets 60 thereto, and two positioning holes 31, 31 each configured to allow a respective one of aftermentioned positioning pins 65, 65 (FIG. 3) of the lateral bracket 60 to be inserted thereinto.

Figure 3:
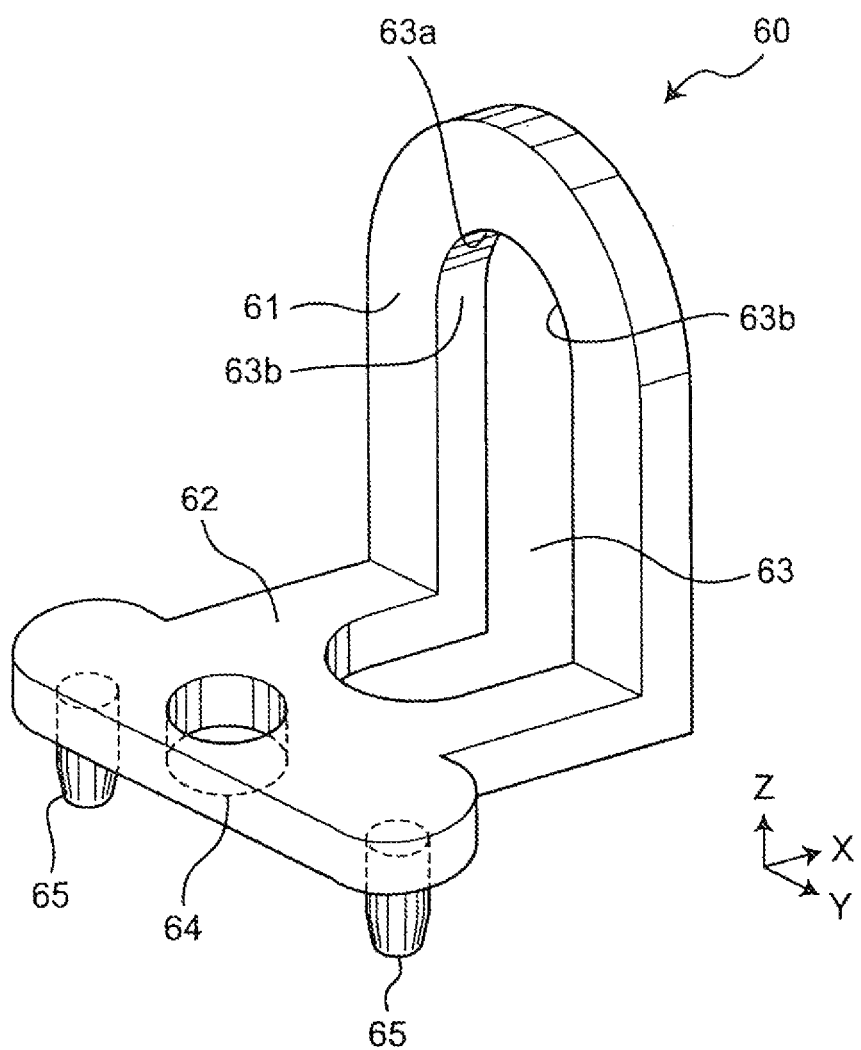
FIG. 3 is a perspective view illustrating a lateral engagement member by itself.

FIG. 3 is a perspective view illustrating the lateral bracket 60 by itself.

As illustrated in FIG. 3, the lateral bracket 60 is a L-shaped member which comprises a vertical wall portion 61 extending in the vehicle up-down direction, and a horizontal wall portion 62 extending approximately horizontally from a lower edge of the vertical wall portion 61, and integrally formed as a single body using a resin material. A groove 63 is formed to extend from the vertical wall portion 61 to the horizontal wall portion 62.

The horizontal wall portion 62 is formed with a bolt-penetration through-hole 64 configured to allow a bolt to be penetratingly inserted thereinto when the bolt is fastened during an operation of attaching each of the lateral brackets 60 to a respective one of the suspension members 30. The horizontal wall portion 62 further has two poisoning pins 65, 65 provided to protrude downwardly from a lower surface thereof in such a manner as to be insertable, respectively, into the positioning holes 31, 31 of the suspension member 30.

Figure 4:
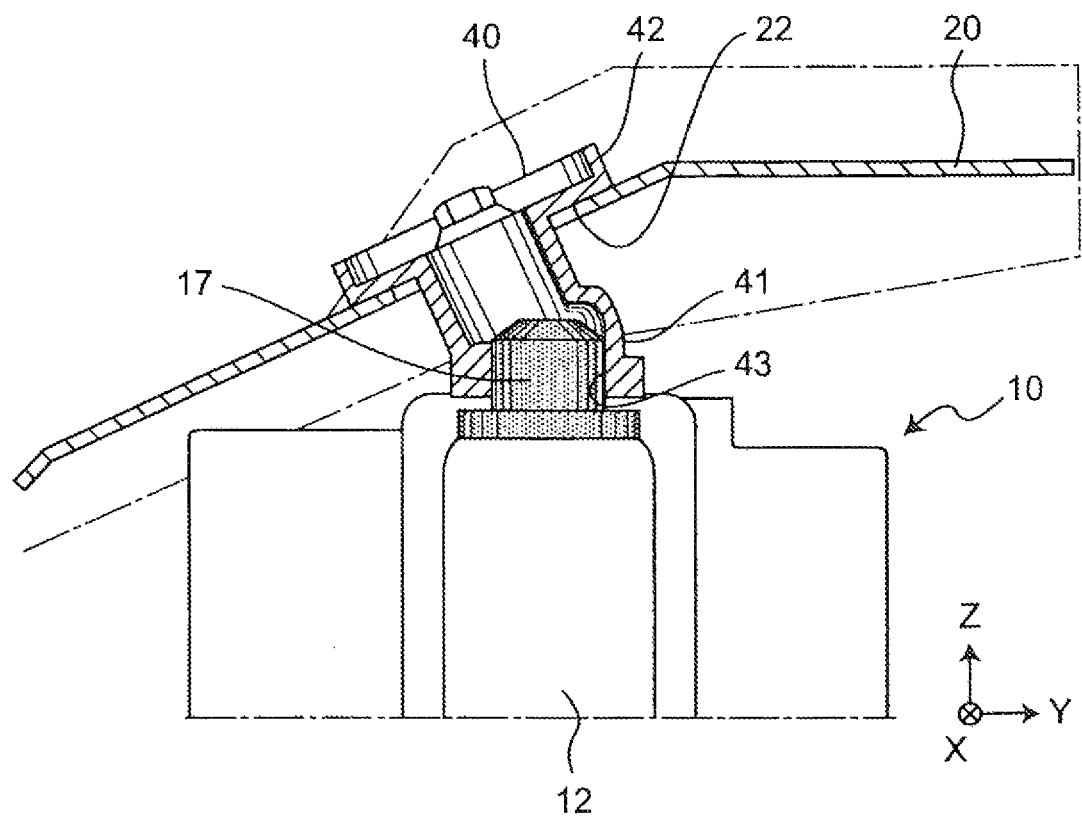
FIG. 4 is a partially-sectional side view illustrating a structure for supporting an upper portion of a radiator.

FIG. 4 is a side view illustrating a structure for supporting an upper portion of the radiator 10. In FIG. 4, each of the upper bracket 40 and the upper shroud member 20 is illustrated as a vertical cross-section taken along a plane passing through a central axis of the upper-elastic-mount support segment 13.

As illustrated in FIG. 4, an upper portion of the radiator 10 is elastically supported by the upper shroud member 20 through the upper bracket 40. That is, the upper portion of the radiator 10 is elastically supported in such a manner that the upper elastic mount 17 attached onto the upper portion of the radiator 10 is fittingly inserted into the recess 43 of the upper bracket 40 attached to the upper shroud member 20, with a gap therebetween in the vehicle up-down direction. More specifically, in a state in which the upper elastic mount 17 is fittingly inserted in the recess 43, a gap is defined between a bottom surface of the recess 43 of the upper bracket 40 (a stepped area formed in an up-down directional intermediate region of the shaft portion 41) and an upper surface of the upper elastic mount 17 located in opposed relation to the bottom surface, and a gap is defined between a lower surface of the shaft portion 41 of the upper bracket 40 and an upper surface of the flange portion of the upper elastic mount 17. In this way, the upper portion of the radiator 10 supported by the upper shroud member 20 through the upper bracket 40 is held in such a manner as to be kept from being displaced horizontally with respect to the upper shroud member 20, i.e., in the vehicle front-rear and right-left directions (in the Y and reverse-Y direction and the X and reverse-X direction). On the other hand, a displacement of the upper portion of the radiator 10 in the vehicle up-down direction (in the Z and reverse-Z direction) is not restricted.

Figure 5:
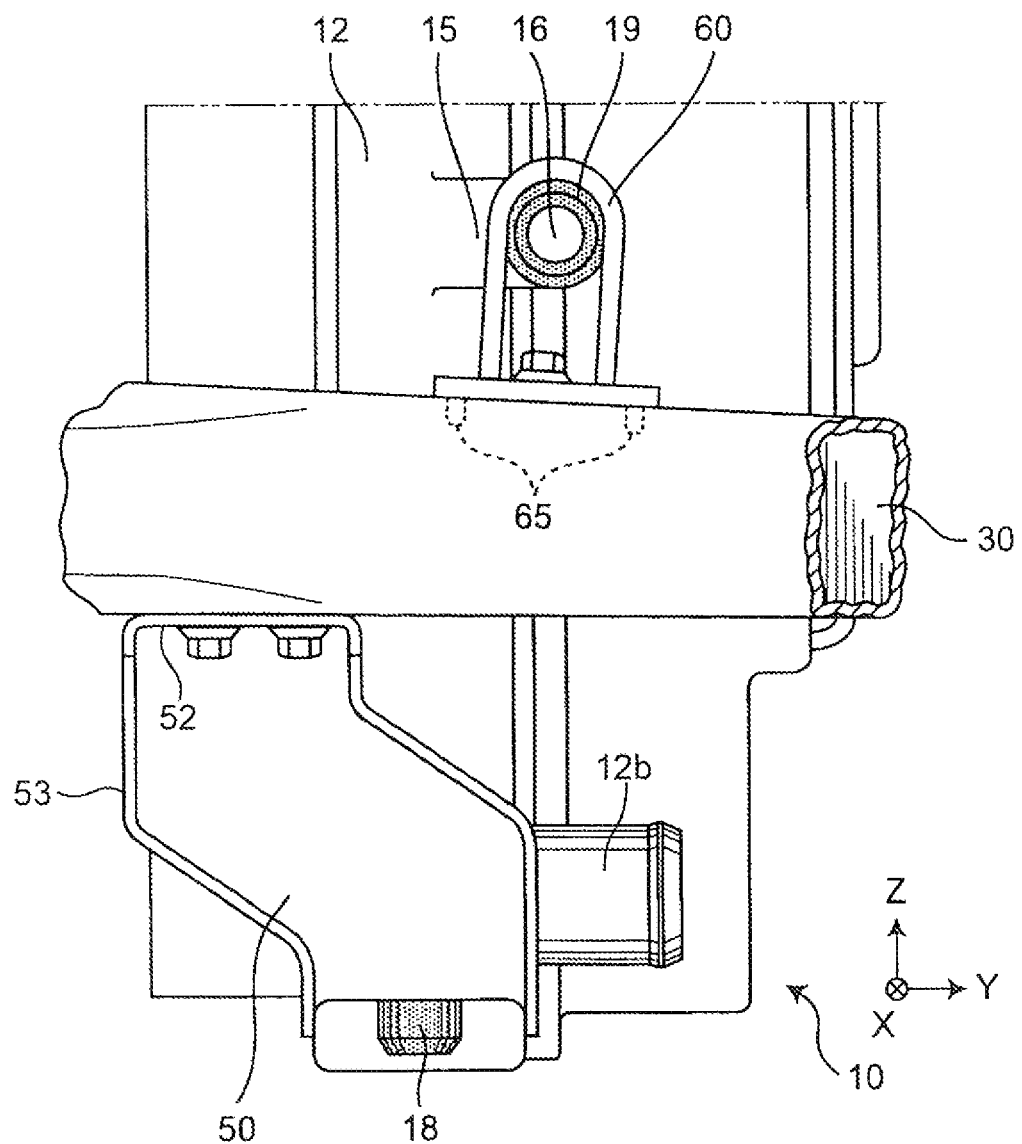
FIG. 5 is a side view illustrating a structure for supporting lateral and lower portions of the radiator.
Figure 6:
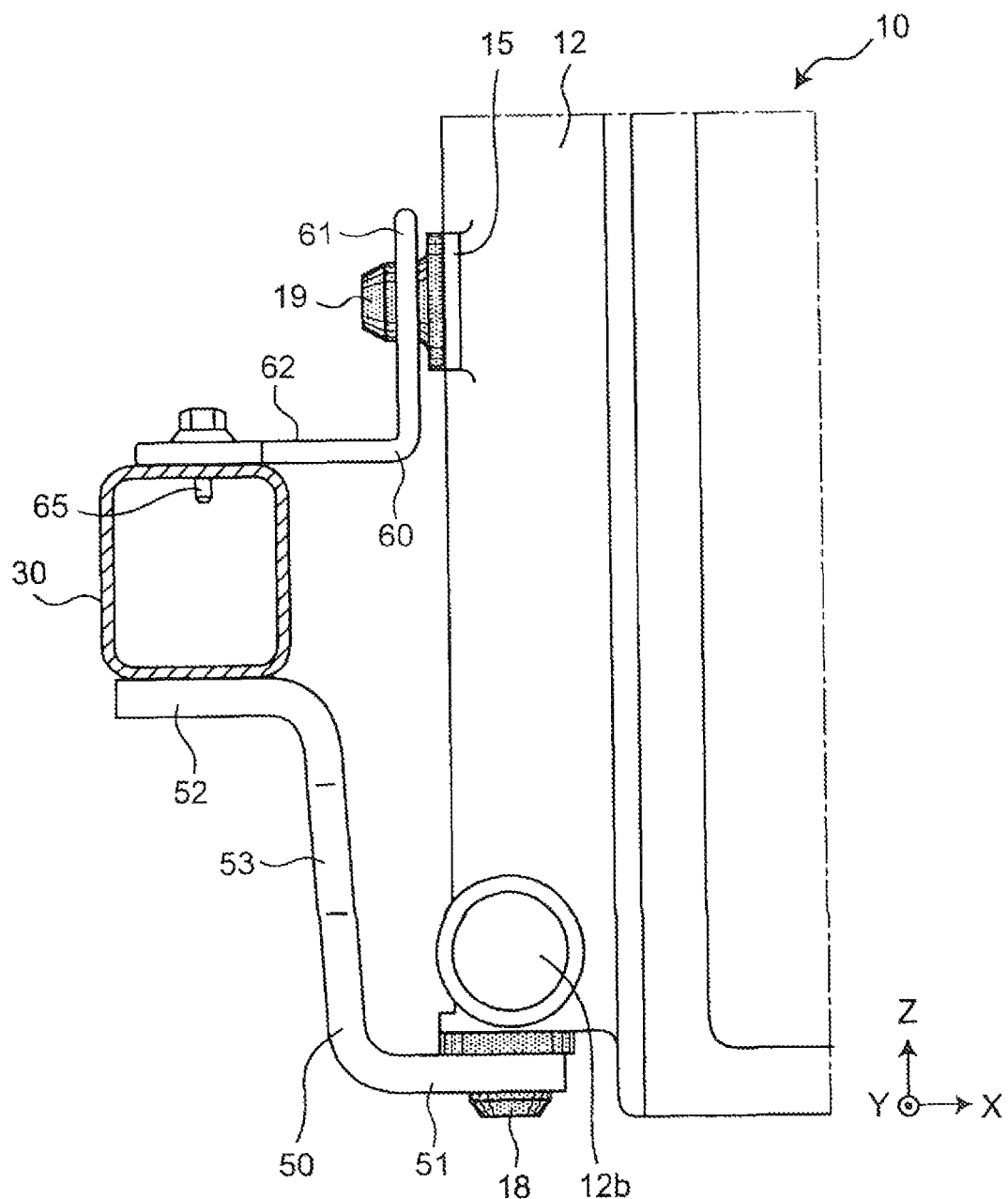
FIG. 6 is a front view illustrating the structure for supporting the lateral and lower portions of the radiator.
Figure 7:
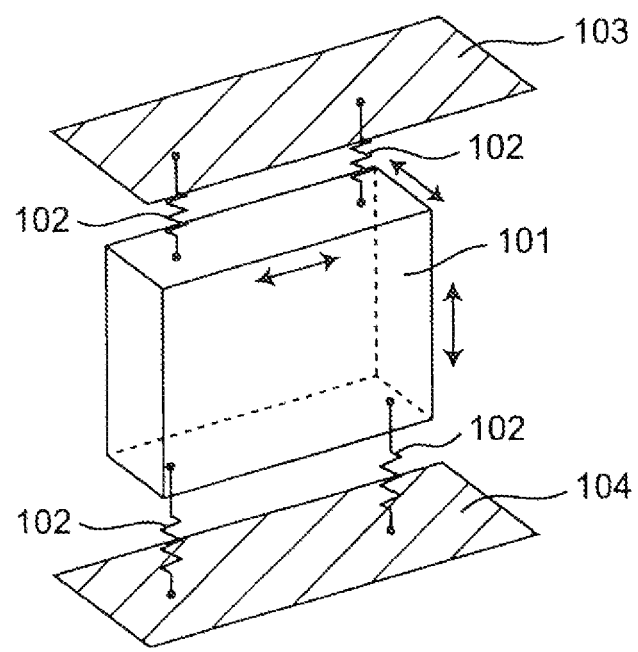
FIG. 7 is a front view illustrating a conventional radiator support structure.

FIG. 5 and FIG. 6 are, respectively, a side view and a front view each illustrating a structure for supporting lateral and lower portions of the radiator 10.

As illustrated in FIGS. 5 and 6, a lower portion of the radiator 10 is elastically supported by the suspension member 30 through the lower bracket 50. That is, the lower portion of the radiator 10 is elastically supported in such a manner that the lower elastic mount 18 attached onto the lower portion of the radiator 10 is fittingly inserted into the through-hole 54 of the lower bracket 50 attached to a lower side of the suspension member 30, in the up-down direction. In this way, the lower portion of the radiator 10 supported by the suspension member 30 through the lower bracket 50 is held in such a manner as to be kept from being displaced downwardly (in the reverse-Z direction) and in the vehicle front-rear and right-left directions (in the Y and reverse-Y direction and the X and reverse-X direction).

Further, a lateral portion of the radiator 10 is elastically supported by the suspension member 30 through the lateral bracket 60. That is, the lateral portion of the radiator 10 is elastically supported in such a manner that the lateral elastic mount 19 located above the suspension member 30 and attached onto the lateral portion of the radiator 10 is inserted into the groove 63 of the lateral bracket 60 attached to the suspension member 30. When the lateral elastic mount 19 is inserted into the groove 63, an upper region 63a of an inner peripheral surface of the lateral bracket 60 defining the groove 63 comes into contact with an upper region of the lateral elastic mount 19 (an upper surface of a convex portion of the lateral elastic mount 19), and opposed side regions 63b of the inner peripheral surface of the lateral bracket 60 defining the groove 63 come into contact with front and rear regions of the lateral elastic mount 19 (vehicle-frontward and vehicle-rearward regions of an outer peripheral surface of the convex portion of the lateral elastic mount 19). That is, when the lateral elastic mount 19 is inserted into the groove 63 of the lateral bracket 60, the lateral elastic mount 19 comes into contact with the inner peripheral surface (63a, 63b) of the lateral bracket 60 defining the groove 63, and thereby comes into engagement with the lateral bracket 60. In this way, the lateral portion of the radiator 10 supported by the suspension member 30 through the lateral bracket 60 is held in such a manner as to be kept from being displaced upwardly (in the Z direction) and in the vehicle front-rear direction (in the Y and reverse-Y direction), with respect to the suspension member 30.

Next, regarding a process of installing the radiator 10 to the vehicle body 1, an outline thereof will be described below.

The radiator 10 is preliminarily assembled by installing the tank sections 12, 12, respectively, to the right and left sides of the radiator main unit 11, and fittingly inserting the elastic mounts 17, 18, 19, respectively, into the support segments 13, 14, 16 protrudingly provided on the tank sections 12, 12.

Further, the lower brackets 50 are attached, respectively, to the right and left suspension members 30, by fastening and fixing the upper support portion 52 of each of the lower brackets 50 to a respective one of the suspension members 30, from therebelow.

Then, the radiator 10 is mounted from above the suspension members 30, in such a manner that the convex portion of each of the lower elastic mounts 18 of the radiator 10 is fitted into the through-hole 54 of a respective one of the lower brackets 50.

Then, each of the lateral brackets 60 is engaged with a respective one of the lateral elastic mounts 19, from thereabove, and attached to a respective one of the suspension members 30. In this operation, the lateral bracket 60 can be smoothly engaged with the lateral elastic mount 19 from thereabove, without interference between the lateral bracket 60 and the lateral elastic mount 19, because the groove 63 of the lateral bracket 60 extends into the horizontal wall portion 62.

Then, the suspension members 30, the radiator 10 and others are installed to the front portion of the vehicle body 1 from therebelow by lifting up the suspension members 30 mounting thereon the engine, the suspension assembly and others together with the radiator 10, while allowing the radiator 10 to pass through an interspace between the right and left side frames. This installation operation can be easily performed, because the radiator 10 is mounted to the suspension members 30 through the lateral brackets 60 and the lower brackets 50, thereby a posture of the radiator 10 with respect to the suspension members 30 becomes stable.

Finally, each of the upper brackets 40 is installed to a respective one of the openings 21 from above the upper shroud member 20, and each of the upper elastic mounts 17 is fittingly inserted into a respective one of the recesses 43 of the upper brackets 40.

Next, regarding a process of singly detaching the radiator 10 from the vehicle body 1 for replacement, repair or the like, an outline thereof will be described below.

First of all, each of the lower brackets 50 is detached from a respective one of the suspension members 30. In this operation, the radiator 10 becomes movable downwardly, only by detaching the lower brackets 50, because each of the lateral elastic mounts 19 of the radiator 10 is engaged with a respective one of the lateral brackets 60 without any restriction on a downward displacement, and each of the upper elastic mounts 17 is engaged with a respective one of the upper brackets 40 without any restriction on a downward displacement.

Therefore, the radiator 10 can be singly detached from the vehicle body 1, simply by detaching each of the lower brackets 50 from a respective one of the suspension members 30, and then moving the radiator 10 downwardly.

As above, in the above embodiment, when the radiator 10 is vibrated, an upward displacement of the radiator 10 is absorbed or damped by the lateral elastic mounts 19 each coming into contact engagement with an upper portion of a respective one of the lateral brackets 60. This makes it possible to reduce a load to be applied to the upper shroud member 20 in the upward direction, thereby allowing the upper shroud member 20 to be reduced in plate thickness and thus reduced in weight, while maintaining desired radiator support rigidity. As a result, it becomes possible to lower the center of gravity of the vehicle to achieve improved drivability.

More specifically, in this embodiment, each of the lateral brackets 60 is in contact engagement with upper, front and rear portions of a respective one of the lateral elastic mounts 19, and each of the lower elastic mounts 18 is inserted in the through-hole 54 of a respective one of the lower brackets 50. This makes it possible to install the suspension members 30 and the radiator 10 to the vehicle body 1, in a state in which the radiator 10 is retained in a desired posture with respect to the suspension members 30 by the lateral brackets 60 and the lower brackets 50. Thus, it becomes possible to eliminate a need for a special jig which has heretofore been used to retain the posture of the radiator 10 during the installation, thereby achieving enhanced installability.

In the above embodiment, each of the lateral elastic mounts 19 is disposed above a respective one of the suspension members 30, so that the radiator 10 can be easily installed to the suspension members 30 only by engaging each of the lateral brackets 60 with a respective one of the lateral elastic mounts 19 from thereabove. Further, each of the lower brackets 50 is attached to the lower side of a respective one of the suspension members 30, so that the radiator 10 can be laid out on a lower side of the vehicle to promote the lowering of the center of gravity of the vehicle. Conversely, in cases where a relative position of each of the lateral elastic mount 19 and the lower bracket 50 with respect to the suspension member 30 is set in a different manner from that described above, it is difficult to obtain both of the effect of facilitating installation and the effect of lowering the center of gravity of a vehicle.

In the above embodiment, when the radiator 10 is vibrated, a downward displacement of the radiator 10 can be absorbed or damped by each of the lower elastic mounts 18 interposed between a respective one of the lower brackets 50 and the radiator 10.

In the above embodiment, the tank sections 12 are provided as the right and left lateral portions of the radiator 10, so that a height dimension of the radiator 10 in the vehicle up-down direction can be reduced. Further, the lateral-elastic-mount support segments 16 are integrally formed with the tank sections 12, so that it becomes possible to easily form the lateral-elastic-mount support segments 16.

It is to be understood that the present invention is not limited to the exemplified embodiment, but various changes and modifications may be made therein without departing from the spirit and scope thereof as set forth in appended claims.

For example, although the radiator 10 in the above embodiment is supported in a vertically upstanding posture, the radiator 10 may be supported in an inclined posture. In this case, a height position of an uppermost end of the radiator 10 can be lowered, and thereby a height dimension of the front portion of the vehicle body can be reduced. That is, the present invention can be applied to a sporty vehicle in which the radiator 10 is mounted in an inclined posture.

Last of all, distinctive features of the vehicle radiator support structure disclosed in the above embodiment and advantageous effects based on the features will be outlined.

The vehicle radiator support structure is designed to mount upper and lower portions of a radiator to a vehicle body. The vehicle radiator support structure comprises: a plurality of upper holding members each attached to an upper shroud member which is one of a plurality of structural members of the vehicle body and configured to hold the upper portion of the radiator in such a manner as to restrict a horizontal relative displacement thereof; at least one pair of lateral elastic members each attached to a respective one of right and left lateral portions of the radiator; and at least one pair of lateral engagement members each attached to another one of the structural members other than the upper shroud member and configured to come into contact engagement with at least an upper portion of a respective one of the lateral elastic members.

According to this feature, when the radiator is vibrated, an upward displacement of the radiator is absorbed or damped by the lateral elastic members each coming into contact engagement with an upper portion of a respective one of the lateral engagement members. This makes it possible to reduce a load to be applied to the upper shroud member in an upward direction, thereby allowing the upper shroud member to be reduced in plate thickness and thud reduced in weight, while maintaining desired radiator support rigidity. As a result, it becomes possible to lower the center of gravity of a vehicle to achieve improved drivability.

Preferably, in the above vehicle radiator support structure, each of the lateral engagement members is attached to a respective one of one pair of suspension members extending in a vehicle front-rear direction, beside and in spaced-apart relation to the respective right and left lateral portions of the radiator, and configured to come into contact engagement with upper, front and rear portions of the respective one of the lateral elastic members, wherein the vehicle radiator support structure further comprises at least one pair of lower support members each attached to a respective one of the suspension members and configured to support the lower portion of the radiator.

According to this feature, each of the lateral engagement members is in contact engagement with the upper, front and rear portions of a respective one of the lateral elastic members, and the lower support members support the lower portion of the radiator. This makes it possible to install the suspension members and the radiator to the vehicle body, in a state in which the radiator is retained in a desired posture with respect to the suspension members by the lateral engagement members and the lower support members. Thus, it becomes possible to eliminate a need for a special jig which has heretofore been used to retain the posture of the radiator during the installation, thereby achieving enhanced installability.

More preferably, in the above vehicle radiator support structure, each of the lateral elastic members is disposed above a respective one of the suspension members, and each of the lower support members is attached to a lower side of a respective one of the suspension members.

According to this feature, each of the lateral elastic members is disposed above a respective one of the suspension members, and each of the lateral engagement members is attached to the lower side of a respective one of the suspension members. This makes it possible to obtained both an effect of being able to easily install the radiator to the suspension members only by engaging each of the lateral engagement members with a respective one of the lateral elastic members from thereabove, and an effect of being able to lay out the radiator on a lower side of a vehicle to promote the lowering of the center of gravity of the vehicle.

More preferably, in the above vehicle radiator support structure, each of the lower support members is configured to support the radiator through a lower elastic member provided on the lower portion of the radiator.

According to this feature, when the radiator is vibrated, a downward displacement of the radiator can be absorbed or damped by each of the lower elastic member interposed between a respective one of the lower support members and the radiator.

Preferably, in the above e radiator support structure, the radiator has two tank sections each made of a resin material and provided as a respective one of the right and left lateral portions thereof, wherein the tank sections are integrally provided, respectively, with one pair of lateral-elastic-member support segments each supporting a respective one of the lateral elastic members.

According to this feature, the tank sections are provided as the right and left lateral portions of the radiator, so that a height dimension of the radiator in a vehicle up-down direction can be reduced. Further, the lateral-elastic-mount support segments are integrally formed with the tank sections, so that it becomes possible to easily form the lateral-elastic-mount support segments.

INDUSTRIAL APPLICABILITY

As above, the present invention is capable of allowing a structural member of an automotive vehicle bearing a moving load of a radiator to be reduced in plate thickness and thus reduced in weight, while maintaining radiator support rigidity, thereby lowering the center of gravity of the vehicle to achieve improved drivability. Thus, the present invention can be suitably used in the field of manufacturing industry for this type of automotive vehicle.

What is claimed is:

1. A vehicle radiator support structure for mounting upper and lower portions of a radiator to a vehicle body, comprising:
   a plurality of upper holding members each attached to an upper shroud member which is one of a plurality of structural members of the vehicle body and configured to hold the upper portion of the radiator in such a manner that the radiator is kept from being displaced horizontally with respect to the upper shroud member;
   a plurality of lower support members each attached to another one of the structural members other than the upper shroud member and configured to support the lower portion of the radiator;
   at least one pair of lateral elastic members each attached to a respective one of right and left lateral portions of the radiator between the upper holding member and the lower support member in a vehicle up-down direction; and
   at least one pair of lateral engagement members each attached to another one of the structural members other than the upper shroud member and configured to come into contact engagement with at least an upper portion of a respective one of the lateral elastic members in such a manner that the radiator is kept from being displaced upwardly with respect to the upper shroud member.

2. The vehicle radiator support structure as defined in claim 1, wherein:
   each of the lateral engagement members includes a vertical wall portion formed with a groove extending in the vehicle up-down direction for allowing a respective one of the lateral elastic members to be inserted thereinto; and
   each of the lateral elastic members includes an upper portion which comes into contact with an upper region of an inner peripheral surface of the lateral engagement members defining the groove when the lateral elastic member is inserted into the groove.

3. The vehicle radiator support structure as defined in claim 1, wherein:

each of the lateral engagement members is attached to a respective one of one pair of suspension members extending in a vehicle front-rear direction, beside and in spaced-apart relation to the respective right and left lateral portions of the radiator, and configured to come into contact engagement with upper, front and rear portions of the respective one of the lateral elastic members; and each of the lower support members is attached to a respective one of the suspension members.

4. The vehicle radiator support structure as defined in claim 1, wherein the radiator has two tank sections each made of a resin material and provided as a respective one of the right and left lateral portions thereof, the tank sections being integrally provided, respectively, with one pair of lateral-elastic-member support segments each supporting a respective one of the lateral elastic members.

5. The vehicle radiator support structure as defined in claim 2, wherein:

each of the lateral engagement members further includes a horizontal wall portion extending approximately horizontally from a lower edge of the vertical wall portion;

the groove is formed to extend from the vertical wall portion to the horizontal wall portion; and each of the lateral elastic members further includes front and rear portions which come into contact with opposed side regions of the inner peripheral surface of the lateral engagement members defining the groove when the lateral elastic member is inserted into the groove.

6. The vehicle radiator support structure as defined in claim 3, wherein:

each of the lateral elastic members is disposed above a respective one of the suspension members; and each of the lower support members is attached to a lower side of a respective one of the suspension members.

7. The vehicle radiator support structure as defined in claim 6, wherein each of the lower support members is configured to support the radiator through a lower elastic member provided on the lower portion of the radiator.

8. A vehicle radiator support structure for mounting upper and lower portions of a radiator to a vehicle body, comprising:

a plurality of upper holding members each attached to an upper shroud member which is one of a plurality of structural members of the vehicle body and configured to hold the upper portion of the radiator in such a manner that the radiator is kept from being displaced horizontally with respect to the upper shroud member while being allowed to be displaced downwardly;

a plurality of lower support members each attached to another one of the structural members other than the upper shroud member and configured to support the lower portion of the radiator in such a manner that the radiator is kept from being displaced downwardly;

at least one pair of lateral elastic members each attached to a respective one of right and left lateral portions of the radiator between the upper holding member and the lower support member in a vehicle up-down direction; and at least one pair of lateral engagement members each attached to another one of the structural members other than the upper shroud member and configured to come into contact engagement with at least an upper portion of a respective one of the lateral elastic members in such a manner that the radiator is kept from being displaced upwardly with respect to the upper shroud member while being allowed to be displaced downwardly.

\* \* \* \* \*